United States Patent
Knoop et al.

(10) Patent No.: US 8,638,724 B1
(45) Date of Patent: Jan. 28, 2014

(54) MACHINE-TO-MACHINE TRAFFIC INDICATOR

(75) Inventors: Dale Russell Knoop, Leawood, KS (US); Bradley Allen Kropf, Overland Park, KS (US); Richard V. Schermerhorn, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 38 days.

(21) Appl. No.: 13/486,018

(22) Filed: Jun. 1, 2012

(51) Int. Cl.
*H04W 4/00* (2009.01)
*H04L 1/00* (2006.01)
*G06F 15/173* (2006.01)

(52) U.S. Cl.
USPC .................... 370/328; 370/235; 709/224

(58) Field of Classification Search
None
See application file for complete search history.

(56) References Cited

U.S. PATENT DOCUMENTS

| | | | |
|---|---|---|---|
| 6,889,048 B1 | 5/2005 | Koo | |
| 7,136,353 B2 | 11/2006 | Ha et al. | |
| 7,310,529 B1 | 12/2007 | Lodge et al. | |
| 2004/0117475 A1* | 6/2004 | Taylor et al. | 709/224 |
| 2010/0039982 A1 | 2/2010 | Itagaki et al. | |
| 2010/0157895 A1* | 6/2010 | Pani et al. | 370/328 |
| 2012/0026941 A1* | 2/2012 | Ahmad et al. | 370/328 |
| 2012/0033613 A1* | 2/2012 | Lin et al. | 370/328 |
| 2012/0155389 A1* | 6/2012 | McNamee et al. | 370/328 |
| 2012/0230302 A1* | 9/2012 | Calcev et al. | 370/336 |
| 2012/0263106 A1* | 10/2012 | Lee et al. | 370/328 |
| 2012/0327779 A1* | 12/2012 | Gell et al. | 370/238 |
| 2013/0039297 A1* | 2/2013 | Wang | 370/329 |
| 2013/0089061 A1* | 4/2013 | Lim et al. | 370/329 |
| 2013/0163520 A1* | 6/2013 | Kimura | 370/328 |
| 2013/0201830 A1* | 8/2013 | Wang et al. | 370/235 |
| 2013/0223350 A1* | 8/2013 | Kang et al. | 370/328 |

\* cited by examiner

*Primary Examiner* — Clemence Han

(57) ABSTRACT

A communication system for operating a wireless communication network to manage machine-to-machine communications comprises a communication transceiver system and a communication processing system. The communication transceiver system is configured to wirelessly receive a data packet having a packet header, wherein the packet header includes a machine-to-machine communication indicator representing that a machine-to-machine communication in the packet payload is originated and consumed by machines and not human operators. The communication processing system is configured to determine at least one wireless network parameter indicating a state of the wireless communication network, and process the machine-to-machine communication indicator and the wireless network parameter to determine whether to transfer or drop the data packet. The communication transceiver system is configured to transfer the data packet if the communication processing system determines to transfer the data packet, and not transfer the data packet if the communication processing system determines not to transfer the data packet.

20 Claims, 6 Drawing Sheets

MACHINE-TO-MACHINE TRAFFIC INDICATOR

TECHNICAL BACKGROUND

The use of wireless communication devices to send and receive information has become increasingly prominent. For example, individuals may utilize communication networks for voice communications, research, entertainment, or for conducting critical business transactions. In addition to these human users, unmanned machines may also be configured to transmit data to other machines. For example, various appliances, toys, vehicles, and other machines could be configured to wirelessly transmit usage information and other data for collection in a database. Interested parties can then access and process the collected usage information from these machines in order to gain some perspective about their use. Likewise, updates and other information may be pushed to machines periodically in order to provide new data for the machine. However, such data transfers are often not time-sensitive and a certain amount of delay in the transfer of the data is acceptable.

Typically, a wireless communication service provider treats requests for data sessions similarly, and assumes that all requests for data sessions require immediate service. If the wireless network does not have the capacity to service a particular data session, the session is denied and another attempt to establish the data session must be re-initiated by the requesting device. However, such attempts to re-initiate data sessions are inefficient, may unnecessarily consume network resources, and deplete battery power due to continually powering up a wireless radio in order to transmit the repetitive data session requests.

Overview

A method of operating a wireless communication network to manage machine-to-machine communications is disclosed. The method comprises, in a communication transceiver system, wirelessly receiving a data packet having a packet header and a packet payload, wherein the packet payload includes a machine-to-machine communication and wherein the packet header includes a machine-to-machine communication indicator representing that the machine-to-machine communication in the packet payload is originated and consumed by machines and not human operators. The method further comprises, in a communication processing system, determining at least one wireless network parameter indicating a state of the wireless communication network. The method further comprises, in the communication processing system, processing the machine-to-machine communication indicator and the wireless network parameter to determine whether to transfer or drop the data packet. The method further comprises, in the communication transceiver system, transferring the data packet over the wireless communication network if the communication processing system determines to transfer the data packet and not transferring the data packet over the wireless communication network if the communication processing system determines not to transfer the data packet.

A communication system for operating a wireless communication network to manage machine-to-machine communications comprises a communication transceiver system and a communication processing system. The communication transceiver system is configured to wirelessly receive a data packet having a packet header and a packet payload, wherein the packet payload includes a machine-to-machine communication and wherein the packet header includes a machine-to-machine communication indicator representing that the machine-to-machine communication in the packet payload is originated and consumed by machines and not human operators. The communication processing system is configured to determine at least one wireless network parameter indicating a state of the wireless communication network, and process the machine-to-machine communication indicator and the wireless network parameter to determine whether to transfer or drop the data packet. The communication transceiver system is configured to transfer the data packet over the wireless communication network if the communication processing system determines to transfer the data packet, and not transfer the data packet over the wireless communication network if the communication processing system determines not to transfer the data packet.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
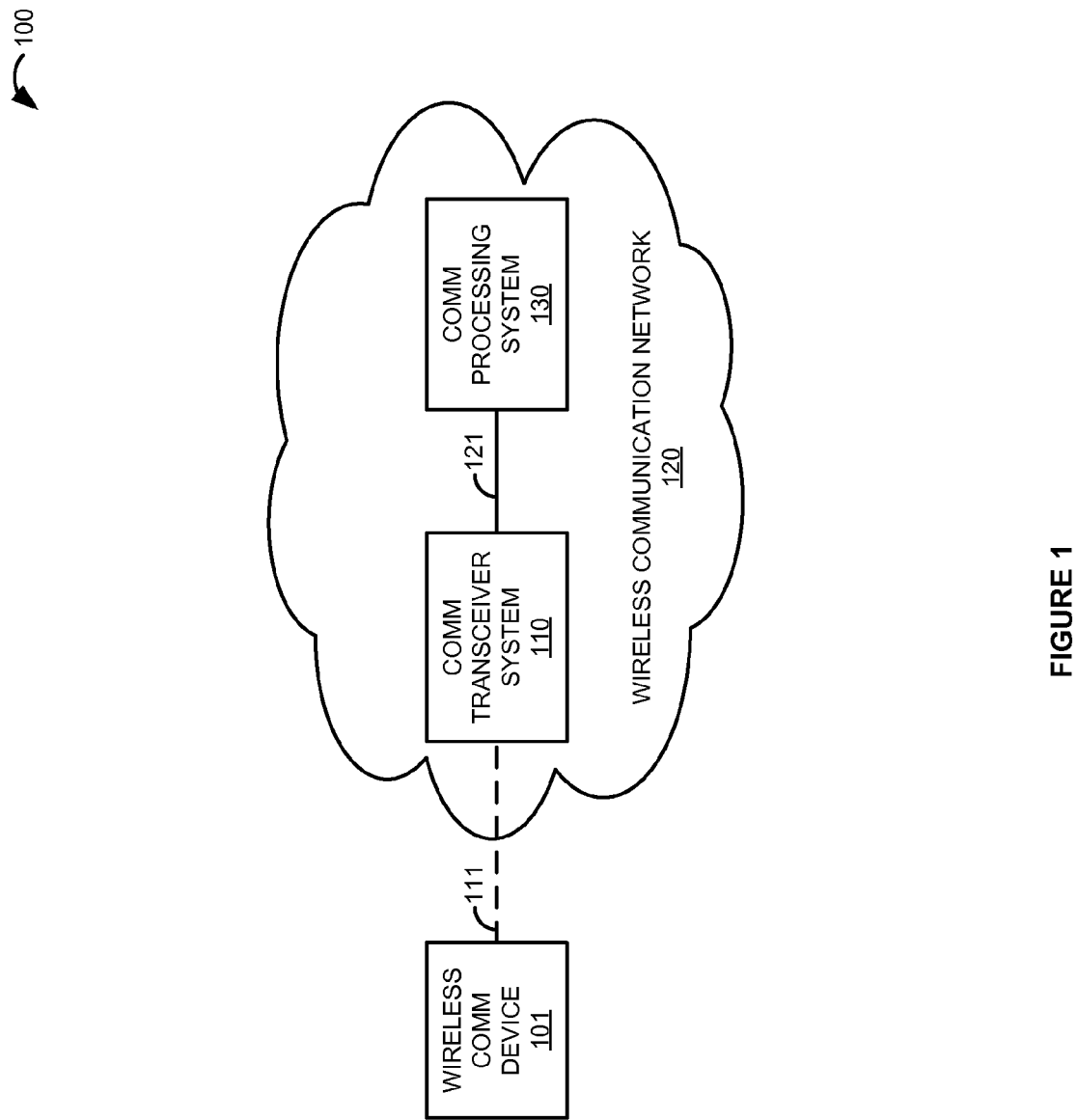
FIG. 1 is a block diagram that illustrates a communication system.

FIG. 1 is a block diagram that illustrates communication system 100. Communication system 100 includes wireless communication device 101, communication transceiver system 110, wireless communication network 120, and communication processing system 130. Wireless communication network 120 includes communication transceiver system 110 and communication processing system 130. Wireless communication device 101 and communication transceiver system 110 are in communication over wireless communication link 111. Communication transceiver system 110 and communication processing system 130 are in communication over communication link 121.

Figure 2:
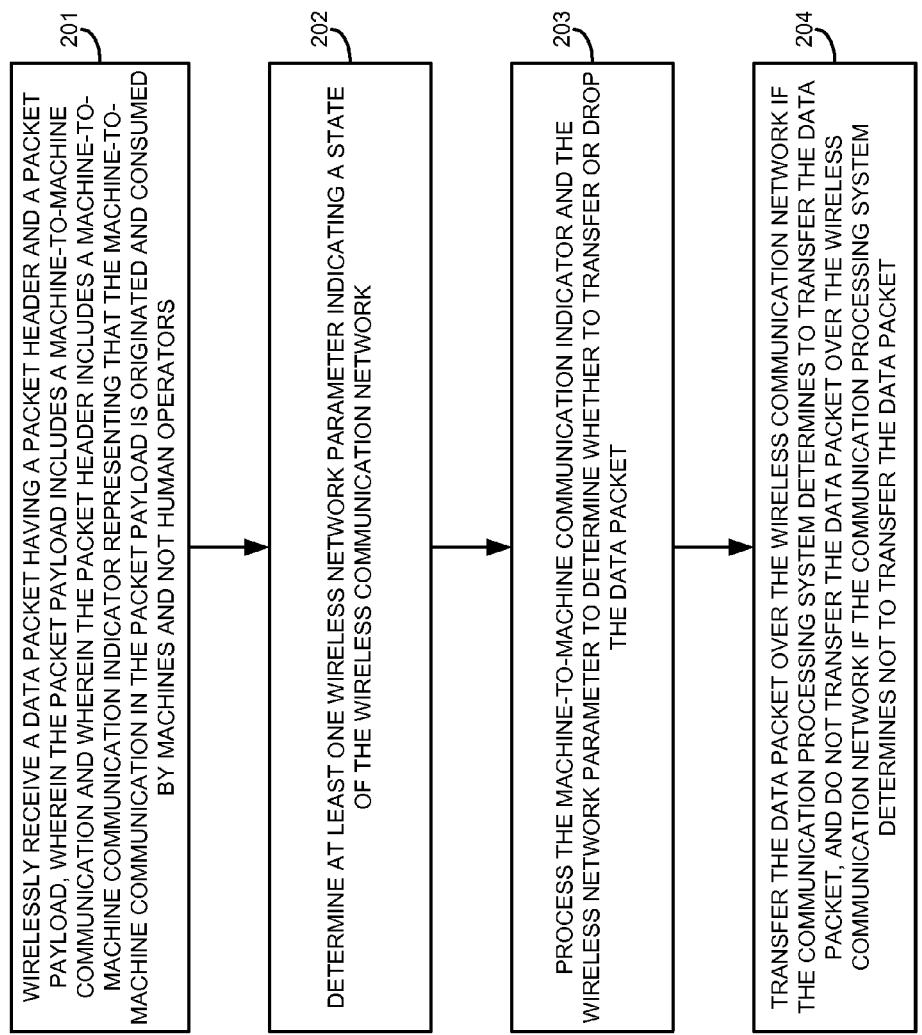
FIG. 2 is a flow diagram that illustrates an operation of the communication system.

FIG. 2 is a flow diagram that illustrates an operation of communication system 100. The steps of the operation are indicated below parenthetically. Initially, communication transceiver system 110 wirelessly receives a data packet having a packet header and a packet payload (201). The packet payload of the data packet includes a machine-to-machine communication, and the packet header includes a machine-to-machine communication indicator representing that the machine-to-machine communication in the packet payload is originated and consumed by machines and not human operators (201). Typically, the data packet is transmitted to communication transceiver system 110 by wireless communication device 101, which in this example could comprise any machine having wireless communication capabilities that is not operated by a human. In some examples, wireless communication device 101 may generate the machine-to-machine communication for the packet payload and insert the machine-to-machine communication indicator into the packet header, which represents that the machine-to-machine communication in the packet payload is originated and consumed by machines and not human operators.

Various software and protocol definitions installed on wireless communication device 101 may be utilized to insert the machine-to-machine communication indicator into the packet header. For example, hypertext transfer protocol (HTTP) software executing on wireless communication device 101 may add the machine-to-machine communication indicator into the packet header, and the data packet could comprise an HTTP packet and the packet header having the machine-to-machine communication indicator could comprise an HTTP header having the machine-to-machine communication indicator. In this case, open systems interconnection (OSI) layer 3 (network layer) software in wireless communication network 120, such as in communication transceiver system 110 and/or communication processing system 130, could detect and interpret the machine-to-machine communication indicator.

Additionally or alternatively, the data packet could comprise a radio access network (RAN) packet, such as an evolution-data optimized (EV-DO) or long term evolution (LTE) packet, and the packet header having the machine-to-machine communication indicator could comprise a RAN header having the machine-to-machine communication indicator. In this example, RAN-related software in the wireless communication device 101, such as EV-DO, LTE, and/or any other wireless network protocols could insert the machine-to-machine communication indicator into the packet header, and layer 2 (data link layer) software executing on network elements within wireless communication network 120 could interpret and use the indicator in some examples.

Referring again to the flow diagram of FIG. 2, communication processing system 130 determines at least one wireless network parameter indicating a state of wireless communication network 120 (202). In some examples, the wireless network parameter could include a number of active data sessions, number of users or connections, time of day, day of week, available bandwidth, or any other parameter associated with a state or utilization of wireless communication network 120. To determine the wireless network parameter indicating the state of wireless communication network 120, communication processing system 130 typically analyzes or queries network elements within wireless communication network 120, such as communication transceiver system 110, for information related to the present utilization of such elements. In some examples, communication processing system 130 may refer to network databases and logs to determine wireless network parameters that indicate the state of wireless communication network 120, and could also utilize historical information for this determination. For example, communication processing system 130 could utilize historical loading information on wireless communication network 120 to identify peaks times of usage of wireless communication network 120, communication transceiver system 110, and other network elements.

Communication processing system 130 processes the machine-to-machine communication indicator and the wireless network parameter to determine whether to transfer or drop the data packet (203). As discussed above, the machine-to-machine communication indicator included in the packet header of the data packet represents that the machine-to-machine communication in the packet payload is originated and consumed by machines and not human operators. Thus, the machine-to-machine communication indicator typically informs communication processing system 130 that the packet payload has a different priority, typically a lower priority, than other data packets which do not include machine-to-machine communication indicators and thus are likely associated with devices operated by human operators. The decision of whether to transfer or drop the data packet is thus typically determined by comparing the wireless network parameter to a threshold level associated with the machine-to-machine communication indicator for that parameter. For example, communication processing system 130 could be configured to compare the number of active data sessions utilizing wireless communication network 120 and/or communication transceiver system 110 to a threshold number of active data sessions, and would drop the data packet having the machine-to-machine communication indicator included in the packet header if the number of active data sessions exceeds the threshold value. In another example, the wireless network parameter could identify times of the day during which peak levels of data traffic typically occur, and communication processing system 130 could determine to drop the data packet if the time when the data packet transfer attempt occurs falls within one of the peak traffic times. Of course, other techniques of processing the machine-to-machine communication indicator and the wireless network parameter to determine whether to transfer or drop the data packet are also possible.

In some examples, communication processing system 130 could apply a different quality of service (QoS) level for the data packet having the machine-to-machine communication indicator than other data packets which do not have such an indicator included in their headers. For example, data packets which are not time sensitive and can be time-shifted or delivered with some delay could include the machine-to-machine communication indicator to implicitly apply a "negative" quality of service level to those data packets. In other words, the machine-to-machine communication indicator could be interpreted by communication processing system 130 as both the type of traffic (i.e., machine-to-machine) and its designation as a sub-grade QoS level. In other examples, the machine-to-machine communication indicator could explicitly indicate a quality of service level for the data packet. Communication processing system 130 could then process the quality of service level and the wireless network parameter to determine whether to transfer or drop the data packet. For example, communication processing system 130 could determine not to transfer the data packet if the quality of service level comprises a negative quality of service level and the wireless network parameter does not meet a threshold associated with the negative quality of service level. It should be noted that in situations where communication processing system 130 determines to drop the data packet, communication processing system 130 may not actually discard the data packet, but may store the data packet for later transfer when permitted by the wireless network parameter.

Referring again to FIG. 2, if communication processing system 130 determines to transfer the data packet, then communication transceiver system 110 transfers the data packet over wireless communication network 120 (204). Alternatively, if communication processing system 130 determines not to transfer the data packet, then communication transceiver system 110 does not transfer the data packet over wireless communication network 120 (204). In this example, communication transceiver system 110 comprises a base station, network switch, router, packet gateway, and/or other communication components that are responsible for packet routing and thus may handle both the ingress routes into and the egress routes out of wireless communication network 120.

In some examples, if communication processing system 130 determines not to transfer the data packet, then communication processing system 130 may direct communication transceiver system 110 to transfer a failure notification for delivery to the source and destination of the data packet that indicates failed delivery of the data packet. For example, the failure notification could indicate that communication processing system 130 has received the data packet but transmission to the destination is delayed. Communication processing system 130 might then determine to transfer the data packet at a later time if permitted by the wireless network parameter at that time. In some examples, responsive to the failure notification, wireless communication device 101 could apply an increased quality of service level to the machine-to-machine communication indicator in the packet header and retransmit the data packet with the increased quality of service level for delivery to communication processing system 130. Communication processing system 130 may then determine to transfer the data packet immediately based on the increased quality of service level for the data packet, even if communication processing system 130 would otherwise determine not to immediately transfer the data packet having the machine-to-machine communication indicator based on the status of the wireless network parameter.

Advantageously, by detecting a machine-to-machine communication indication in packet headers, communication processing system 130 is able to effectively screen and block lower priority machine-to-machine data traffic during periods of high congestion or utilization of wireless communication network 120. Communication processing system 130 can determine whether to transfer or drop a data packet having a machine-to-machine communication indicator by processing the indicator and a wireless network parameter that indicates a state of wireless communication network 120. In this manner, communication processing system 130 will continue to block the transfer of the data packet associated with machine-to-machine traffic until the wireless network parameter is met.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. In this example, wireless communication device 101 comprises a device which originates data packets autonomously and not by a human operator. For example, wireless communication device 101 could comprise a refrigerator or other appliance, vehicle, digital billboard, industrial equipment, or any other machine having wireless communication capabilities—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and communication transceiver system 110.

Communication transceiver system 110 comprises communication circuitry for receiving and transmitting data over wireless communication network 120. Communication transceiver system 110 typically comprises RF communication circuitry and an antenna. The RF communication circuitry typically includes an amplifier, filter, RF modulator, and signal processing circuitry. Communication transceiver system 110 may also comprise a router, server, network switch, packet gateway, memory device, software, processing circuitry, cabling, power supply, network communication interface, structural support, or some other communication apparatus. Communication transceiver system 110 could comprise a base station, Internet access node, telephony service node, wireless data access point, or some other communication system—including combinations thereof. Some examples of communication transceiver system 110 include a base transceiver station (BTS), base station controller (BSC), radio base station (RBS), Node B, enhanced Node B (eNodeB), home agent, packet data serving node (PDSN), network switch, mobile switching center, router, switching system, packet gateway, network gateway system, Internet access node, application server, service node, firewall, or some other communication system—including combinations thereof. Communication transceiver system 110 may be configured to use time-division multiplexing (TDM), Internet Protocol (IP), Ethernet, optical networking, wireless protocols, communication signaling, or some other communication format—including combinations thereof. Wireless network protocols that may be utilized by communication transceiver system 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Wireless communication network 120 comprises the core network of a wireless communication service provider, and could include routers, gateways, telecommunication switches, servers, processing systems, or other communication equipment and systems for providing communication and data services. Wireless communication network 120 could comprise wireless communication nodes, telephony switches, Internet routers, network gateways, computer systems, communication links, or some other type of communication equipment—including combinations thereof. Wireless communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Wireless communication network 120 may be configured to communicate over metallic, wireless, or optical links—including combinations thereof. Wireless communication network 120 may be configured to use time-division multiplexing (TDM), Internet Protocol (IP), Ethernet, optical networking, wireless protocols, communication signaling, or some other communication format—including combinations thereof. In some examples, wireless communication network 120 includes further access nodes and associated equipment for providing communication services to many wireless communication devices across a large geographic region.

Communication processing system 130 comprises a processing system and communication transceiver. Communication processing system 130 may also include other components such as a router, server, data storage system, and power supply. Communication processing system 130 may reside in a single device or may be distributed across multiple devices. Communication processing system 130 may be a discrete system or may be integrated within other systems—including other systems within communication system 100. In some examples, communication processing system 130 could comprise a home agent, packet data serving node (PDSN), network switch, mobile switching center, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
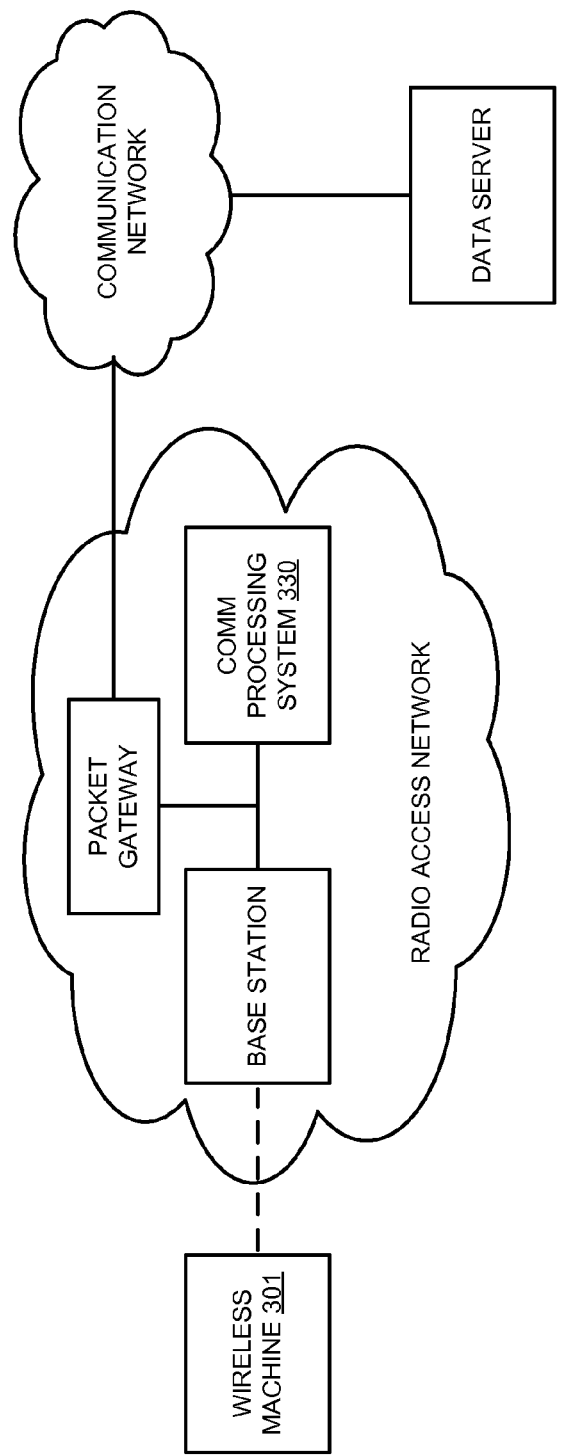
FIG. 3 is a block diagram that illustrates a communication system in an exemplary embodiment.

FIG. 3 is a block diagram that illustrates communication system 300 in an exemplary embodiment. Communication system 300 includes wireless machine 301 and communication processing system 330. Communication processing system 330 is shown as part of a radio access network along with a base station and a packet gateway. The packet gateway is in communication with another communication network that connects to a data server. Wireless machine 301 provides an example of wireless communication device 101, although device 101 may use alternative configurations Likewise, communication processing system 330 provides an example of communication processing system 130, although system 130 may use alternative configurations. In the example of communication system 300, the base station and packet gateway of the radio access network provide examples of network elements that could be part of a communication transceiver system, such as communication transceiver system 110 of FIG. 1.

Figure 4:
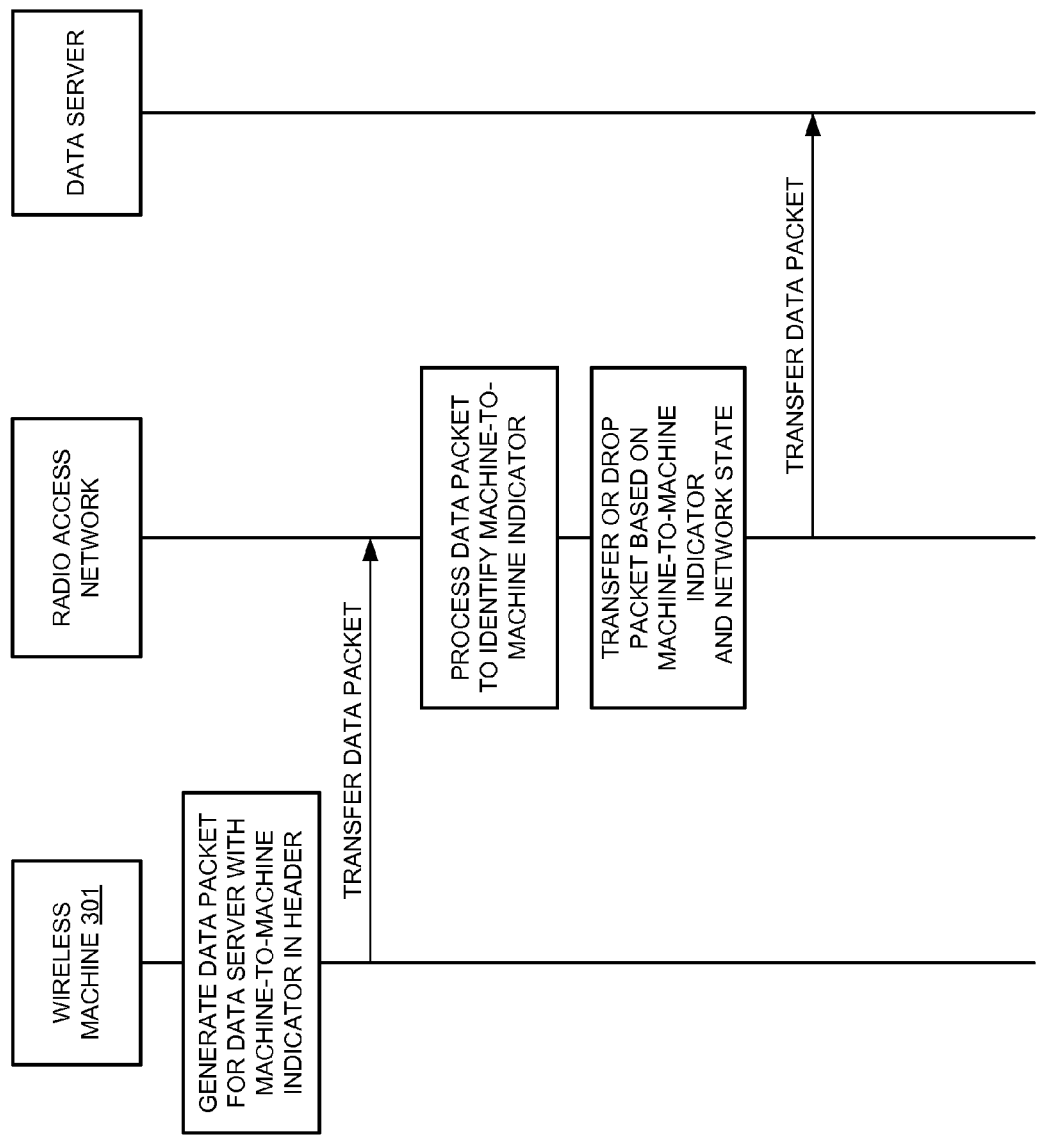
FIG. 4 is a sequence diagram that illustrates an operation of a communication system in an exemplary embodiment.

FIG. 4 is a sequence diagram that illustrates an operation of communication system 300 in an exemplary embodiment. In this example, wireless machine 301 comprises a tractor having wireless communication capabilities. The tractor is configured to automatically transmit usage information periodically for delivery to the data server, such as times of day when the tractor is used and geographic coordinates where the usage occurs. The manufacturer of the tractor administers the data server and has an agreement with the radio access network to use the wireless carrier's network to serve as a data connection for the usage information transmitted by the tractor.

Initially, the tractor (wireless machine 301) generates a data packet intended for delivery to the data server. However, because the usage information is not critical or time-sensitive, delivery of the packet does not need to occur immediately. The tractor manufacturer has therefore agreed to configure the tractor to insert a machine-to-machine communication indicator into a header of the data packet in exchange for being billed a lower cost per megabyte for this data traffic over the radio access network. The machine-to-machine communication indicator informs the radio access network of the relatively lower priority of the data packet and that the packet originated by a machine and is destined for delivery to a machine and not human operators. In this example, RAN software in the wireless communication equipment installed on the tractor inserts the machine-to-machine communication indicator into a RAN header of the packet. After the machine-to-machine communication indicator is inserted into the header of the data packet, wireless machine 301 wirelessly transmits the packet to the base station in the radio access network for delivery to the data server.

Communication processing system 330 receives the data packet from the base station and processes the packet to identify the machine-to-machine communication indicator in the header of the packet. For example, layer 2 (data link layer) software installed on communication processing system 330 could read and detect the machine-to-machine communication indicator at the RAN level. Communication processing system 330 also determines a state of the radio access network, such as a current level of usage, congestion, available bandwidth, time of day, and the like. Communication processing system 330 then determines whether to drop or transfer the packet based on the machine-to-machine communication indicator and the network state. In this example, the radio access network is not heavily utilized, so communication processing system 330 determines to transfer the data packet to the data server since there are available network resources to accommodate the data transfer. Communication processing system 330 therefore directs the packet gateway to transfer the data packet for delivery to the data server.

Figure 5:
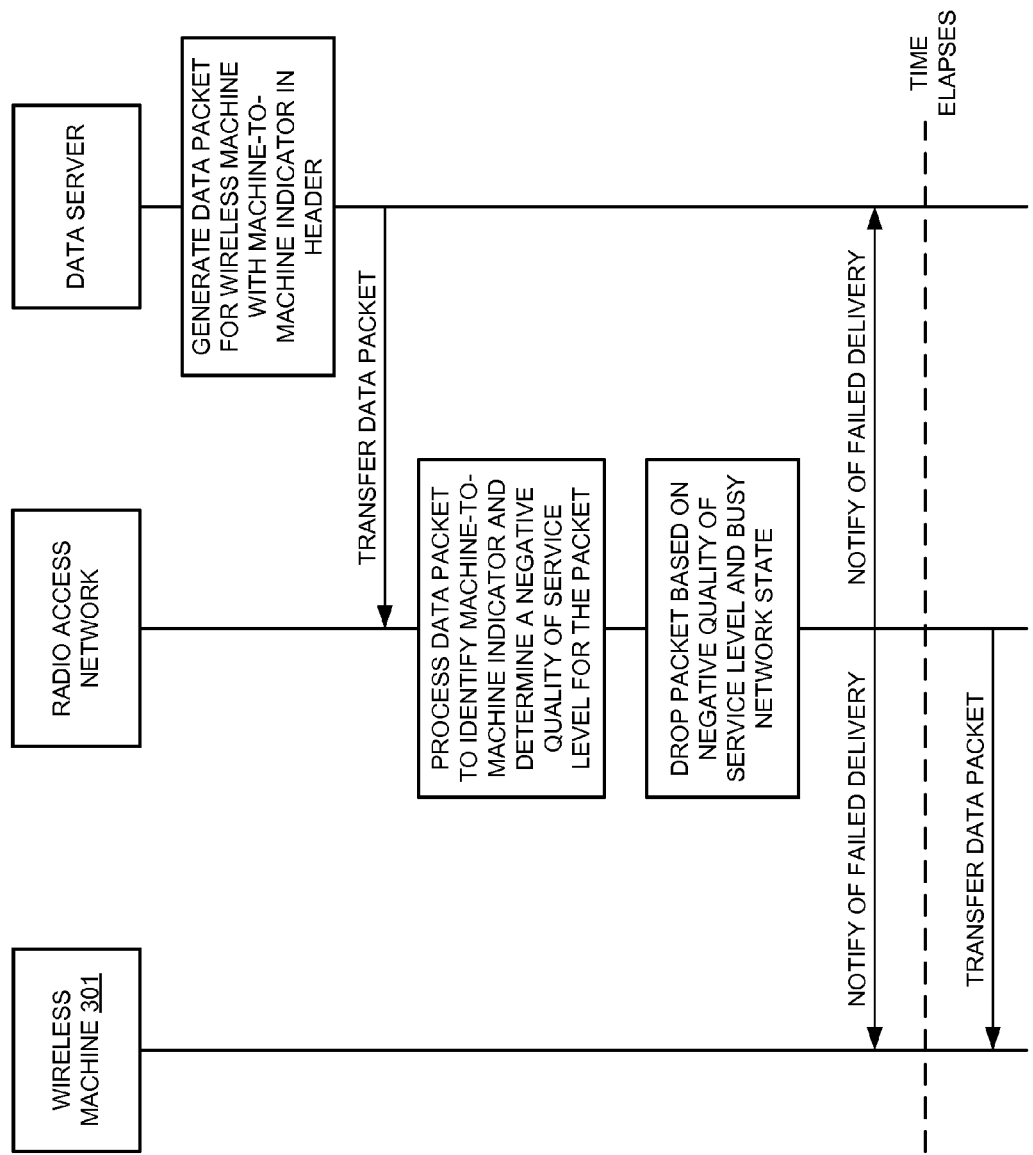
FIG. 5 is a sequence diagram that illustrates an operation of a communication system in an exemplary embodiment.

FIG. 5 is a sequence diagram that illustrates an operation of communication system 300 in an exemplary embodiment. In this example, wireless machine 301 comprises a digital sign or billboard having wireless communication capabilities. The data server is configured to automatically transmit updated display information periodically for delivery to the digital sign, such as advertisements, announcements, or other information intended for display by the digital sign. The entity utilizing the digital sign and the data server and has an agreement with the radio access network to use the wireless carrier's network to serve as a data connection for the display information transmitted by the data server.

Initially, the data server generates a data packet intended for delivery to the digital sign (wireless machine 301 in the example of FIG. 5). However, because the display information for the digital sign included in the payload of the data packet has a low priority and is not as time-sensitive as real-time communications, delivery of the packet does not need to occur immediately. The digital sign user has therefore agreed to configure the data server to insert a machine-to-machine communication indicator into an HTTP header of the data packet in exchange for being billed a lower cost per megabyte for this data traffic over the radio access network. The machine-to-machine communication indicator informs the radio access network that the packet originated by a machine and is destined for delivery to a machine and not human operators, and thus has a relatively lower priority than other data packets. For example, the machine-to-machine communication indicator could inform the radio access network that it is acceptable for the wireless connection serving wireless machine 301 to occasionally go into a dormant state depending on the state of the RAN. After the machine-to-machine communication indicator is inserted into the HTTP header of the data packet, the data server transfers the packet to the radio access network for delivery to the digital sign.

The packet gateway in the radio access network receives the data packet and provides the packet to communication processing system 330 for processing. Layer 3 (network layer) software in the communication processing system 330 is utilized to process the data packet to identify the machine-to-machine communication indicator in the header of the packet. Communication processing system 330 also determines a state of the radio access network, such as a level of current usage, congestion, available bandwidth, time of day, and the like. Communication processing system 330 then determines whether to drop or transfer the packet based on the machine-to-machine communication indicator and the network state. In this example, the radio access network is heavily congested, so communication processing system 330 determines to drop the data packet based on the busy network state and the machine-to-machine communication indicator. Communication processing system 330 therefore stores the data packet for later delivery when network conditions permit.

Communication processing system 330 also transmits a notification of failed delivery to wireless machine 301 and the data server to inform these entities that the data packet will not be delivered by the radio access network at this time. In some examples, wireless machine 301 and the data server are aware that the wireless connection may occasionally go silent as the RAN serves other network users, and so such notifications might be unnecessary in that case. Regardless of how they become aware of the reduced quality of service level attached to their data sessions, wireless machine 301 and the data server do not continually issue data transfer requests or otherwise "ping" the RAN to complete the session. Instead, each element involved in the transfer of the display information for the digital sign recognizes that a negative QoS session has been established and acts accordingly, where the data session occurs/resumes whenever the wireless network parameter meets a predetermined threshold value.

Ultimately, based on monitoring one or more network parameters, communication processing system 330 determines that the network state has become less congested, and finally transfers the data packet for delivery to wireless machine 301. In this manner, the digital sign will receive updated display information at a time of lower utilization of the radio access network, thereby preserving network resources during busier periods for higher-priority human users and real-time communications, while also reducing costs for the user of the digital sign by receiving a reduced data rate in exchange for this delayed data transfer.

Figure 6:
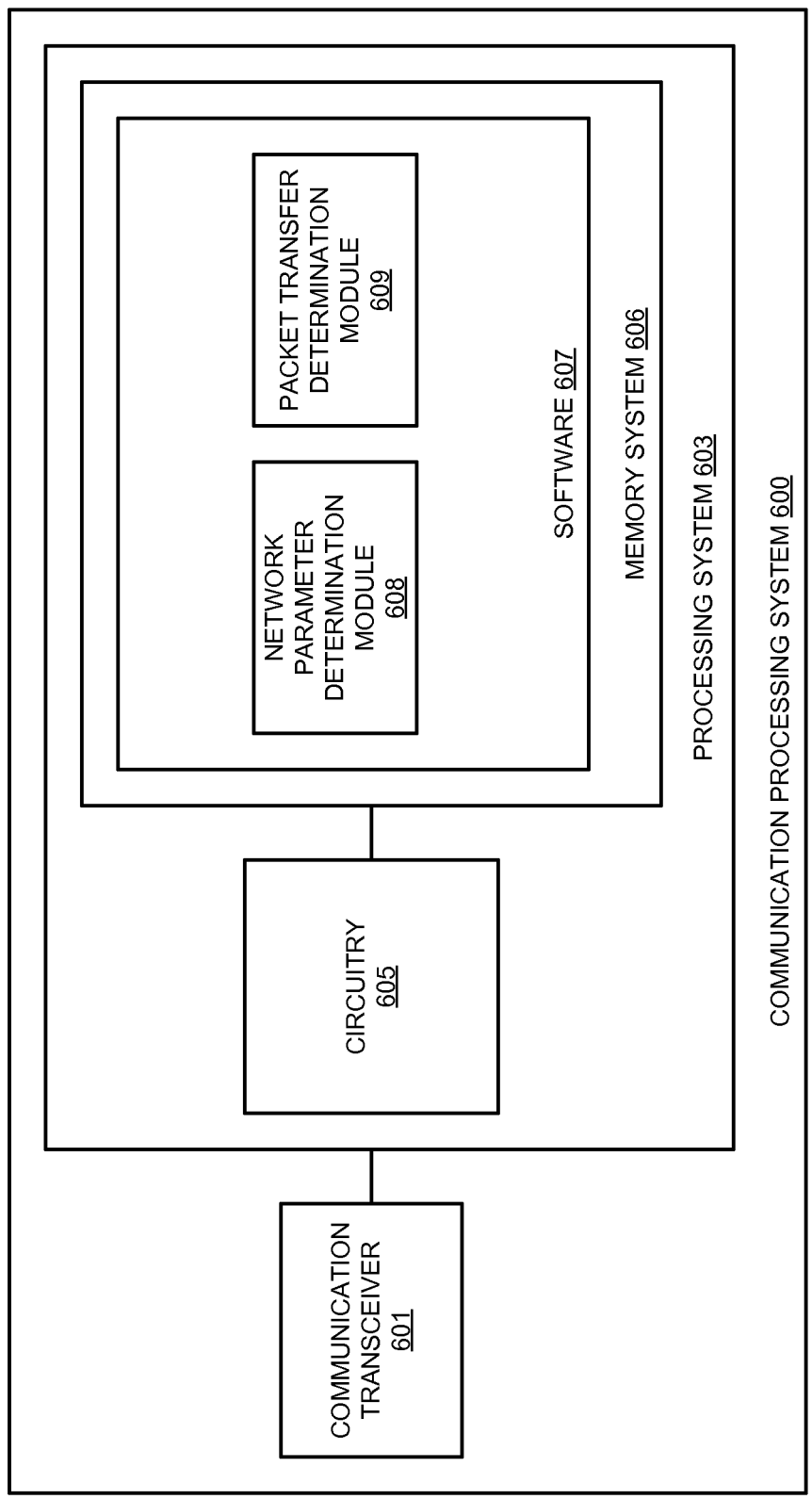
FIG. 6 is a block diagram that illustrates a communication processing system.

FIG. 6 is a block diagram that illustrates communication processing system 600. Communication processing system 600 provides an example of communication processing systems 130 and 330, although systems 130 and 330 may use alternative configurations. Communication processing system 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608 and 609.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 may be configured to transmit an instruction to a communication transceiver system to transfer a data packet over a wireless communication network if communication processing system 600 determines to transfer the data packet, and not to transfer the data packet over a wireless communication network if communication processing system 600 determines not to transfer the data packet.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608 and 609, although software 607 could have alternative configurations in other examples.

When executed by circuitry 605, operating software 607 directs processing system 603 to operate as described herein for data usage management systems 130 and 330. In particular, operating software 607 directs processing system 603 to determine at least one wireless network parameter indicating a state of a wireless communication network. Additionally, operating software 607 directs processing system 603 to process a machine-to-machine communication indicator and the wireless network parameter to determine whether to transfer or drop a data packet, wherein the data packet has a packet header and a packet payload, the packet payload includes a machine-to-machine communication, and the packet header includes the machine-to-machine communication indicator representing that the machine-to-machine communication in the packet payload is originated and consumed by machines and not human operators.

In this example, operating software 607 comprises a network parameter determination software module 608 that determines at least one wireless network parameter indicating a state of a wireless communication network. In addition, operating software 607 comprises a packet transfer determination software module 609 that processes a machine-tomachine communication indicator and the wireless network parameter to determine whether to transfer or drop a data packet, wherein the data packet has a packet header and a packet payload, the packet payload includes a machine-to-machine communication, and the packet header includes the machine-to-machine communication indicator representing that the machine-to-machine communication in the packet payload is originated and consumed by machines and not human operators.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to manage machine-to-machine communications, the method comprising:
   in a communication transceiver system, wirelessly receiving a data packet having a packet header and a packet payload, wherein the packet payload includes a machine-to-machine communication and wherein the packet header includes a machine-to-machine communication indicator representing that the machine-to-machine communication in the packet payload is originated and consumed by machines and not human operators;
   in a communication processing system, determining at least one wireless network parameter indicating a state of the wireless communication network;
   in the communication processing system, processing the machine-to-machine communication indicator and the wireless network parameter to determine whether to transfer or drop the data packet; and
   in the communication transceiver system, transferring the data packet over the wireless communication network if the communication processing system determines to transfer the data packet and not transferring the data packet over the wireless communication network if the communication processing system determines not to transfer the data packet.

2. The method of claim 1 wherein the data packet comprises a Hyper-Text Transfer Protocol (HTTP) packet and wherein the packet header having the machine-to-machine communication indicator comprises an HTTP header having the machine-to-machine communication indicator.

3. The method of claim 1 wherein the data packet comprises a Radio Access Network (RAN) packet and wherein the packet header having the machine-to-machine communication indicator comprises a RAN header having the machine-to-machine communication indicator.

4. The method of claim 3 wherein the RAN packet comprises an LTE packet.

5. The method of claim 1 wherein the machine-to-machine communication indicator indicates a quality of service level for the data packet.

6. The method of claim 5 wherein processing the machine-to-machine communication indicator and the wireless network parameter to determine whether to transfer or drop the data packet comprises processing the quality of service level and the wireless network parameter to determine whether to transfer or drop the data packet.

7. The method of claim 6 wherein the communication processing system determines not to transfer the data packet if the quality of service level comprises a negative quality of service level and the wireless network parameter does not meet a threshold associated with the negative quality of service level.

8. The method of claim 1 further comprising, if the communication processing system determines not to transfer the data packet, then in the communication transceiver system, transferring a failure notification for delivery to the source and destination of the data packet that indicates failed delivery of the data packet.

9. The method of claim 8 wherein the failure notification indicates that the communication processing system has received the data packet but transmission to the destination is delayed.

10. The method of claim 8 wherein the source of the data packet, responsive to the failure notification, applies an increased quality of service level to the machine-to-machine communication indicator in the packet header and retransmits the data packet with the increased quality of service level for delivery to the communication processing system.

11. A communication system for operating a wireless communication network to manage machine-to-machine communications, the communication system comprising:
    a communication transceiver system configured to wirelessly receive a data packet having a packet header and a packet payload, wherein the packet payload includes a machine-to-machine communication and wherein the packet header includes a machine-to-machine communication indicator representing that the machine-to-machine communication in the packet payload is originated and consumed by machines and not human operators;
    a communication processing system configured to determine at least one wireless network parameter indicating a state of the wireless communication network, and process the machine-to-machine communication indicator and the wireless network parameter to determine whether to transfer or drop the data packet; and
    the communication transceiver system configured to transfer the data packet over the wireless communication network if the communication processing system determines to transfer the data packet, and not transfer the data packet over the wireless communication network if the communication processing system determines not to transfer the data packet.

12. The communication system of claim 11 wherein the data packet comprises a Hyper-Text Transfer Protocol (HTTP) packet and wherein the packet header having the machine-to-machine communication indicator comprises an HTTP header having the machine-to-machine communication indicator.

13. The communication system of claim 11 wherein the data packet comprises a Radio Access Network (RAN) packet and wherein the packet header having the machine-to-machine communication indicator comprises a RAN header having the machine-to-machine communication indicator.

14. The communication system of claim 13 wherein the RAN packet comprises an LTE packet.

15. The communication system of claim 11 wherein the machine-to-machine communication indicator indicates a quality of service level for the data packet.

16. The communication system of claim 15 wherein communication processing system configured to process the machine-to-machine communication indicator and the wireless network parameter to determine whether to transfer or drop the data packet comprises communication processing system configured to process the quality of service level and the wireless network parameter to determine whether to transfer or drop the data packet.

17. The communication system of claim 16 wherein the communication processing system determines not to transfer the data packet if the quality of service level comprises a negative quality of service level and the wireless network parameter does not meet a threshold associated with the negative quality of service level.

18. The communication system of claim 11 further comprising, if the communication processing system determines not to transfer the data packet, then the communication transceiver system is configured to transfer a failure notification for delivery to the source and destination of the data packet that indicates failed delivery of the data packet.

19. The communication system of claim 18 wherein the failure notification indicates that the communication processing system has received the data packet but transmission to the destination is delayed.

20. A method of operating a wireless communication network to manage machine-to-machine communications, the method comprising:

in a communication transceiver system, wirelessly receiving a data packet having a packet header and a packet payload, wherein the packet payload includes a machine-to-machine communication and wherein the packet header includes a machine-to-machine communication indicator representing that the machine-to-machine communication in the packet payload is originated and consumed by machines and not human operators and indicates a negative quality of service level for the data packet;

in a communication processing system, determining at least one wireless network parameter indicating a state of the wireless communication network;

in the communication processing system, processing the negative quality of service level indicated by the machine-to-machine communication indicator and the wireless network parameter to determine whether to transfer or drop the data packet; and in the communication transceiver system, transferring the data packet over the wireless communication network if the communication processing system determines to transfer the data packet and not transferring the data packet over the wireless communication network if the communication processing system determines not to transfer the data packet.

* * * * *